Aug. 17, 1971 R. E. STILWELL 3,600,224
METHOD AND APPARATUS FOR CLEANING LARGE SURFACES
Filed Nov. 18, 1968 6 Sheets-Sheet 1

FIG_1

FIG_2

INVENTOR.
ROBERT E. STILWELL
BY J.W. Anderson
C. C. Tripp
ATTORNEYS Aug. 17, 1971          R. E. STILWELL          3,600,224

METHOD AND APPARATUS FOR CLEANING LARGE SURFACES

Filed Nov. 18, 1968

*INVENTOR.*
ROBERT E. STILWELL

BY *F. W. Anderson*
*C. E. Tripp*

ATTORNEYS

FIG_12

FIG_13

FIG_14

FIG_15

FIG_16

FIG_17

FIG_18

FIG_19

FIG_20

FIG_21

United States Patent Office 3,600,224
Patented Aug. 17, 1971

3,600,224
METHOD AND APPARATUS FOR CLEANING LARGE SURFACES
Robert E. Stilwell, Santa Clara, Calif., assignor to FMC Corporation, San Jose, Calif.
Filed Nov. 18, 1968, Ser. No. 776,494
Int. Cl. B08b 1/00, 3/10
U.S. Cl. 134—6                                29 Claims

ABSTRACT OF THE DISCLOSURE

Apparatus for cleaning airplanes or automobiles is disclosed in which high velocity air and a cleansing fluid is discharged through a plurality of cloth sleeves, the outer ends of which buffet the surface to be cleaned. For cleaning an airplane, a wheeled carriage has a blower which is connected by ducting supported by a boom to the sleeves. For cleaning an automobile, which is moved along a path, a frame straddles the path and supports a plurality of blowers. The blowers are connected by ducting to a plurality of cloth sleeves which whip against the surface of the automobile as air and cleaning fluid are discharged out the open ends of the sleeves.

BACKGROUND OF THE INVENTION

The present invention relates to apparatus for cleaning large surfaces, particularly surfaces which are easily dented or marred, such as the exterior surfaces of airplanes or automobiles.

In cleaning large surfaces, a brush is frequently used which has a hard, solid base in which the bristles are mounted. There is always the danger that the base will strike the surface being cleaned and dent or otherwise mar the surface. This is particularly true where large surfaces are being cleaned with a long handled brush, which is more difficult to control.

A brush generally covers, at any given instant, only a small area of the surface to be cleaned. Large brushes capable of covering large areas are not only unwieldy but are usually impractical because they do not conform in contour to the contour of the surface being cleaned. Thus, frequently, despite their size, they can only contact the surface, at any instant, in a small contact zone.

Where a more rapid scrubbing action with a brush is required to clean a surface, the brush is usually driven by a motor connected to the base of the brush. The added weight of the power operated brush adjacent the surface to be cleaned adds to the difficulty of control, particularly when the brush is mounted at the end of a long handle. Thus, a brush capable of a rapid scrubbing action is more likely to mar or dent the surface being cleaned.

SUMMARY OF THE INVENTION

There is provided in the present invention a method and apparatus for cleaning large surfaces safely without the danger of marring, scratching, or denting the surface. The apparatus is capable of scrubbing a large area in any given instant, yet always conforms to the contour of the surface being scrubbed. A very rapid scrubbing action is achieved without using a heavy cumbersome power source adjacent the surface to be cleaned.

In brief, in the present invention, air is discharged through a flexible sleeve which is positioned to engage the surface to be cleaned. The sleeve pulsates, or flutters, in contact with the surface as the air is expelled therefrom to effect a scrubbing action on the surface which is to be cleaned, such as the surface of an automobile or airplane. Preferably, a plurality of cloth sleeves are connected to a manifold which receives high velocity air from a blower. A soap or detergent solution may be introduced into the stream of air from the blower for conveyance through the sleeves and onto the surface to be cleaned.

The sleeves may be arranged in any desired pattern to accommodate the object to be cleaned, and relative movement between the sleeves and the surface of the object can be effected, either by moving the sleeves relative to the object or the object relative to the sleeves. In one form of the invention the ends of the sleeves are irregular (that is, either notched, cut diagonally, or split) to increase the area and/or whipping action of the sleeve end in contact with the surface.

The soft, limp, flexible sleeves, which can be of any convenient length (such as, for example, ten feet long) can impart a rapid scrubbing action to the surface without any danger of denting, scratching, or marring the surface in any way. The sleeves, at any instant, scrub a wide area of any contour, since any number of sleeves can be connected to receive air from the blower and since the sleeves can be made long enough to vibrate, or flutter, against any portion of the surface, however shaped. By increasing the velocity of the air directed through the sleeves, the sleeves can be made to whip rapidly against the surface to be cleaned to dislodge even stubborn dirt and grime therefrom.

It is therefore one object of the present invention to provide an improved method and apparatus for cleaning large surfaces. It is another object of the present invention to provide a method and apparatus for cleaning surfaces with minimum risk of marring or denting the surfaces. It is yet another object of the present invention to provide a method and apparatus for cleaning large contoured surfaces.

DESCRIPTION OF THE PREFERRED EMBODIMENTS

Figure 1:
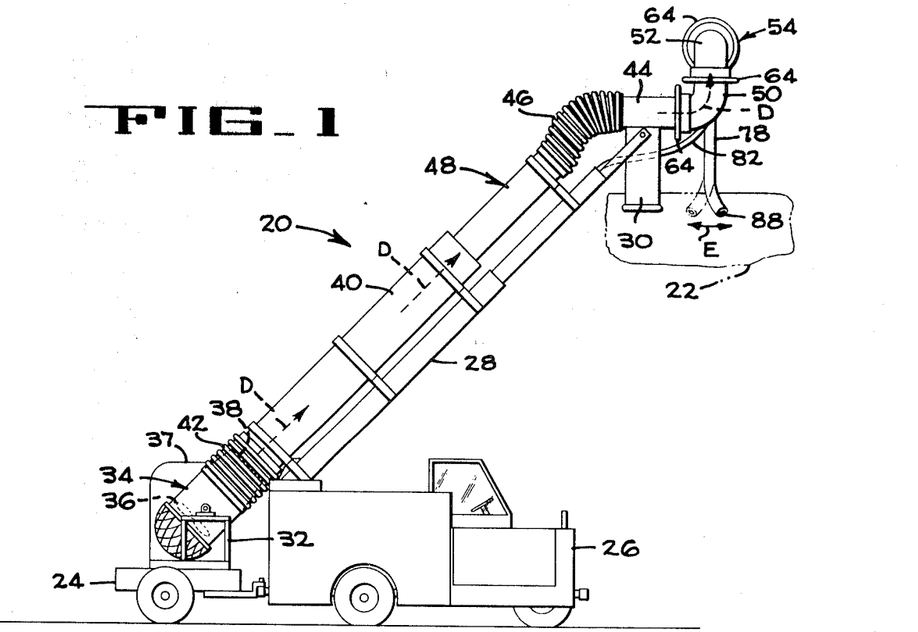
FIG. 1 is a side view in elevation of an apparatus for cleaning aircraft in accordance with the present invention.

There is shown in FIG. 1 apparatus 20 for cleaning aircraft, such as illustrated at 22. The apparatus shown in FIG. 1 includes a wheeled carriage 24 which is towed by vehicle 26. The vehicle 26, which is similar to the vehicle shown in the Pat. U.S. 3,243,123 issued Mar. 29, 1966 to D. M. Inghram et al., has a telescopic boom 28. An operator's cage 30 is pivotally mounted on the outer end of the boom.

Two upstanding spaced apart supports 32 (only one of which is shown) are mounted on the carriage 24 and pivotally support therebetween a blower 34 of the type shown in the Pat. U.S. 2,768,859, issued Oct. 30, 1956 to J. M. Patterson. The blower has a propeller 36 and an internal combustion engine 37 which drives the propeller to generate a high velocity air stream. The air stream discharges through the outlet end 38 of the blower casing.

A rigid telescopic duct portion 40 which may, for example, be aluminum or plastic tubing, is connected to the boom 28 and is connected at its inner end to the blower casing by means of a duct portion comprising a flexible accordion connecting sleeve 42. A rigid duct portion 44 is mounted on the operator's cage 30 and is connected by a duct portion consisting of a flexible accordion connecting sleeve 46 to the outer end of duct portion 40. The duct made up of duct portions 42, 40, 46 and 44 is designated generally at 48.

Figures 5, 6, 7:
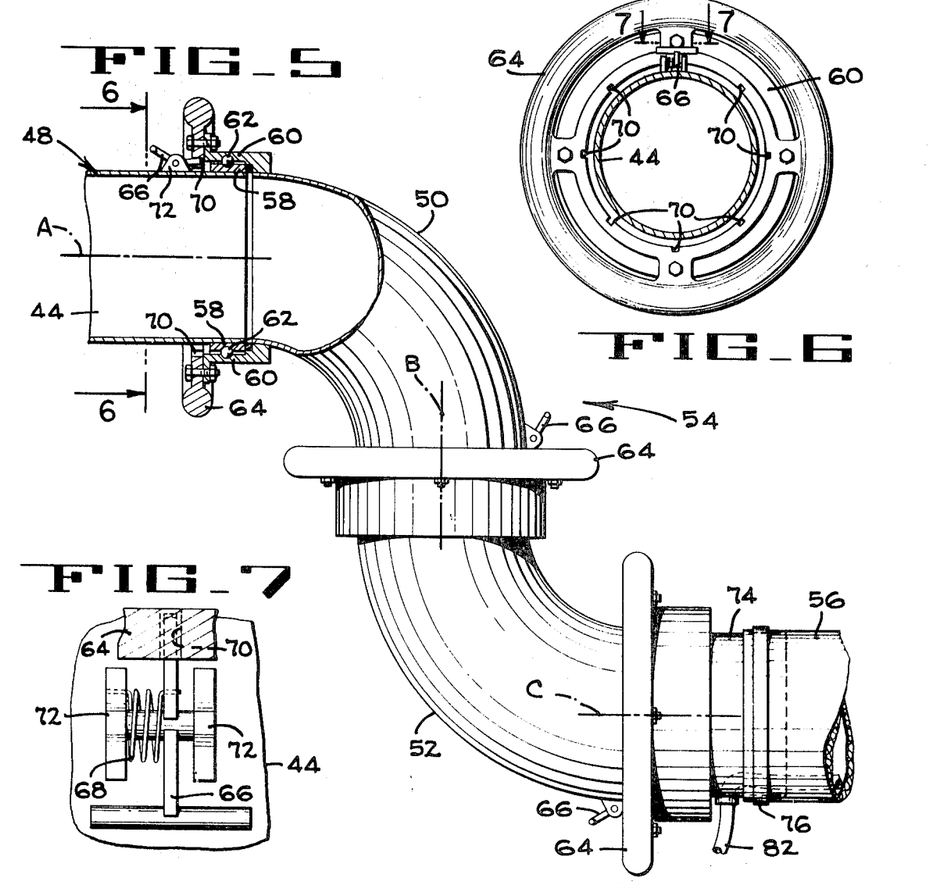
FIG. 5 is a side view in elevation, greatly enlarged, showing a swivel joint to which the manifold is connected for adjustable positioning.
FIG. 6 is a view taken on the lines 6—6 of FIG. 5.
FIG. 7 is a view taken on the lines 7—7 of FIG. 6.

As shown best in FIG. 5, two rigid 90° elbows 50, 52 are connected together to define a universal swivel joint, designated generally at 54, which connects a manifold 56 to duct 48. An inner ball bearing race 58 is secured to the outer end of duct portion 44 and an outer ball bearing race 60 is secured to the inner end of elbow 50. Race 60 extends over race 58, and a plurality of balls 62 are received between the races to permit easy rotational movement of elbow 50 around the central longitudinal axis A of duct portion 44. A wheel 64 is connected to outer race 60 to permit manual rotation of sleeve 50. A latch 66 is normally urged by spring 68 (see FIG. 7) into one of a plurality of notches 70 (see FIG. 6) equally spaced around the inner periphery of the wheel. Latch 66 is pivotally mounted between ears 72 secured to duct portion 44 so that when latch 66 is engaged with a notch on wheel 64, elbow 50 will be held in a selected fixed position relative to duct portion 44 by latch 66. The inner end of elbow 52 is connected to the outer end of elbow 50 in the same manner the inner end of elbow 50 is connected to the outer end of duct 44. Thus, elbow 52 is rotatable about a central axis B parallel to the walls of elbow 50 at the outer end thereof. Similarly, a fitting 74 is connected to the outer end of elbow 52 for rotation about a central axis C parallel to the walls of elbow 52 at the outer end thereof. Alternatively, an electro-mechanical power drive, controlled from the operator's cage, may be used to rotate, as by a worm or by a gear train, elbow 50, elbow 52, and fitting 74.

Figure 3:
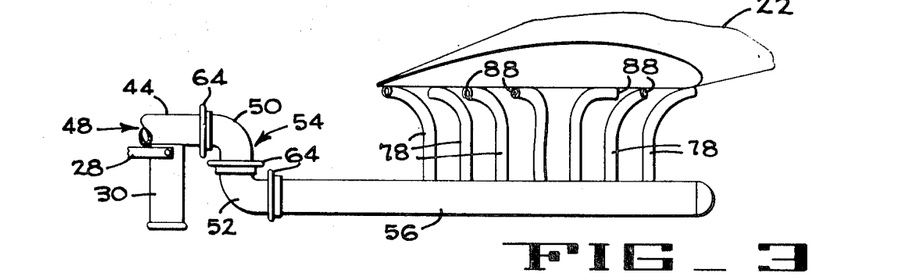
FIG. 3 is a fragmentary view taken as the view of FIG. 1, with the apparatus adjusted to clean under the wing of the aircraft.
Figure 4:
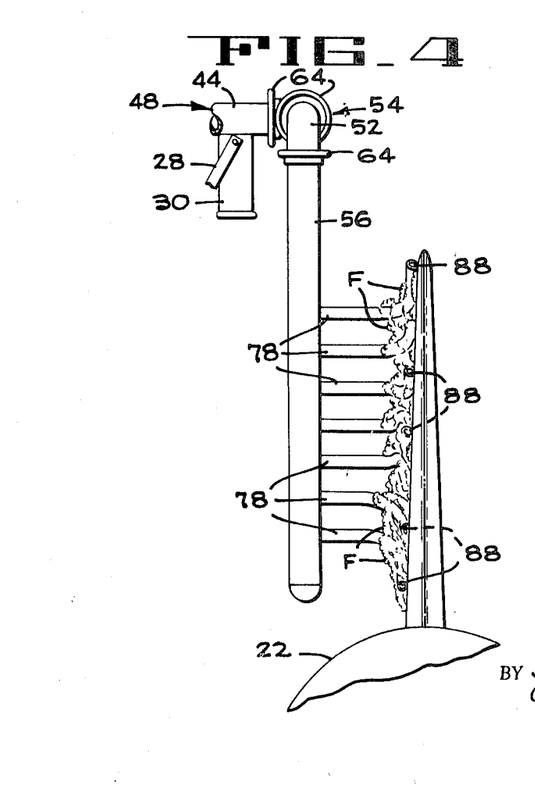
FIG. 4 is a fragmentary view taken as the view of FIG. 2, with the apparatus adjusted to clean a substantially vertical surface of the aircraft tail assembly.

The manifold 56 (see FIG. 2), which is preferably made of a cloth, such as nylon, is connected to fitting 74, as by strap 76. Preferably, the cloth manifold has a vinyl coating to render it air retentive. The outer end of the manifold 56 is closed so that when a stream of air generated by the blower assembly moves through duct 48 and swivel joint 54 to manifold 56, as indicated by arrows D, the manifold will be extended as shown in FIGS. 2, 3 and 4.

A plurality of flexible elongated members in the form of cloth tubes, or sleeves 78, preferably nylon, which are open at both ends, are sewn over openings 80 (see FIG. 8) in the manifold so that air in the manifold is discharged out the sleeves. The flexible cloth sleeves, which are limp when the propeller is not driven, will be extended when power is applied to the propeller to generate a stream of air. When the propeller starts to generate a stream of air, the pressure in the manifold rises, and air from the manifold is discharged through the sleeves. The outer ends of the sleeves flutter and whip about as the air rushes out the sleeves, as indicated by the arrows E in FIGS. 1 and 2.

In operating the apparatus of FIGS. 1–7 to cleanse aircraft, the vehicle 26 is driven to a point beside the airplane, and the boom 28 is raised either by the driver of the vehicle or by an operator in the operator's cage. Controls for actuating the boom, either to lift the boom in a vertical plane or to extend or retract the boom, are located both in the cab of vehicle 26 and in the operator's cage 30. Controls (not shown) to tilt the blower assembly in the plane of the boom, and to turn the blower on or off, may be located on the carriage, as shown in the Pat. U.S. 2,768,859, or in the cab of the vehicle 26 and/or the operator's cage 30. However, during operation, the blower may be held stationary since the flexible connecting sleeve 42 will permit relative movement between the boom and the blower.

Figure 2:
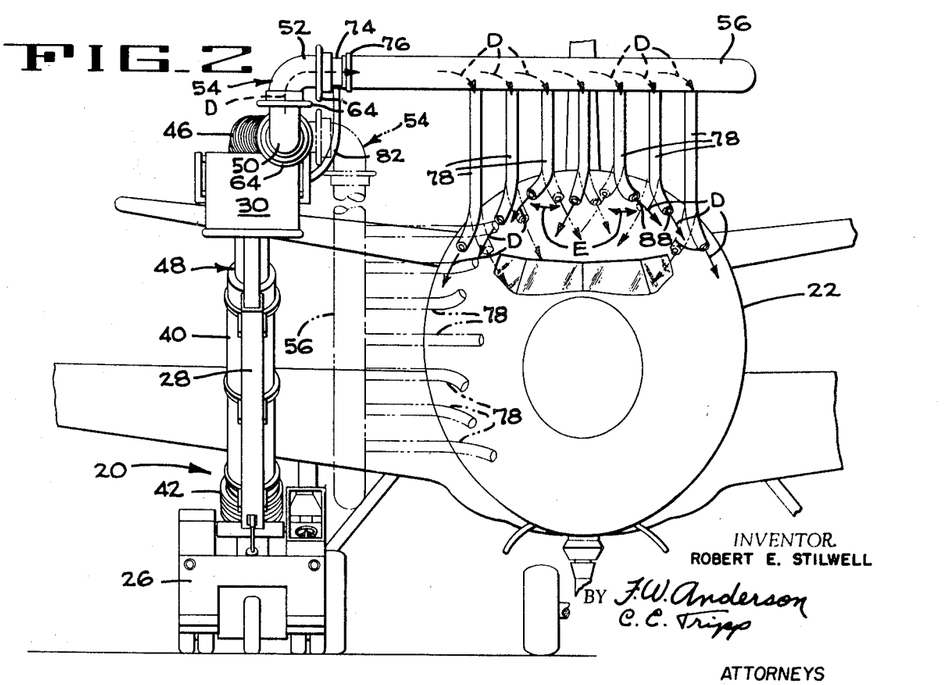
FIG. 2 is a front view of the apparatus of FIG. 1.

After the boom is raised to the position shown in FIGS. 1 and 2, the operator in cage 30 adjusts the elbows 50, 52 and manifold 56 by means of wheels 64 to position the ends of the sleeves 78 in contact with a surface of the aircraft, such as the top of the fuselage as shown in FIG. 1 and the solid lines of FIG. 2. When the propeller 36 is rotated at high speed, a rapid stream of air passes through the duct 48, swivel joint 54, manifold 56, and sleeves 78, as indicated by arrows D. The high velocity air discharging through the flexible sleeves extends the sleeves and causes a rapid fluttering, or agitation, of the ends thereof to whip the ends of the sleeves against the surface to be cleaned in scrubbing engagement therewith.

Figure 9:
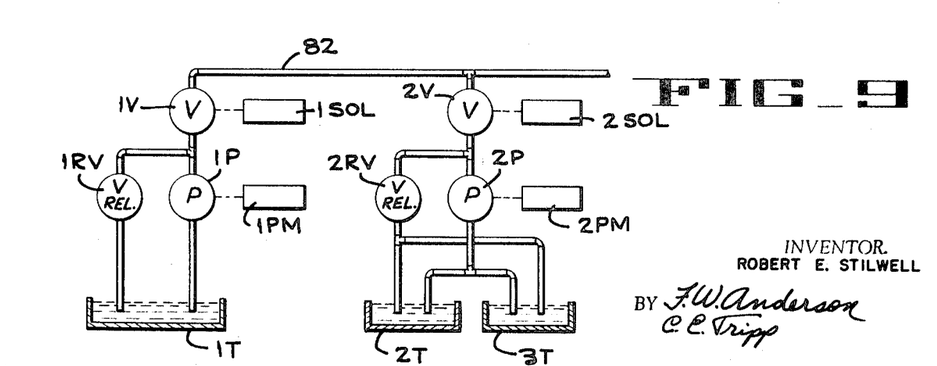
FIG. 9 is a schematic diagram of the hydraulic circuit for application of the detergent solution and the rinse.

As described in the Pat. U.S. 3,243,123 the vehicle 26 has three tanks (herein designated 1T, 2T and 3T) which are utilized in washing aircraft. The large tank 1T holds a cleansing fluid, such as a detergent solution, and the two smaller tanks 2T, 3T hold rinse water, or a rinse solution. As shown in FIG. 9, a pump 1P, driven by pump motor 1PM, takes fluid from the detergent tank 1T, and delivers it under pressure through a solenoid valve 1V to a line 82 when the solenoid 1SOL of valve 1V is energized and valve 1V is open. When solenoid 1SOL is deenergized, and valve 1V is closed, the fluid from pump 1P is diverted through relief valve 1RV and returned to tank 1T. Alternatively, a pump 2P, driven by pump motor 2PM, takes fluid from the two rinse tanks 2T and 3T, and delivers it under pressure through a solenoid valve 2V to line 82 when the solenoid 2SOL of valve 2V is energized and valve 2V is open. When solenoid 2SOL is deenergized, and valve 2V is closed, the fluid from pump 2P is diverted through relief valve 2RV and returned to tanks 2T and 3T.

Figure 10:
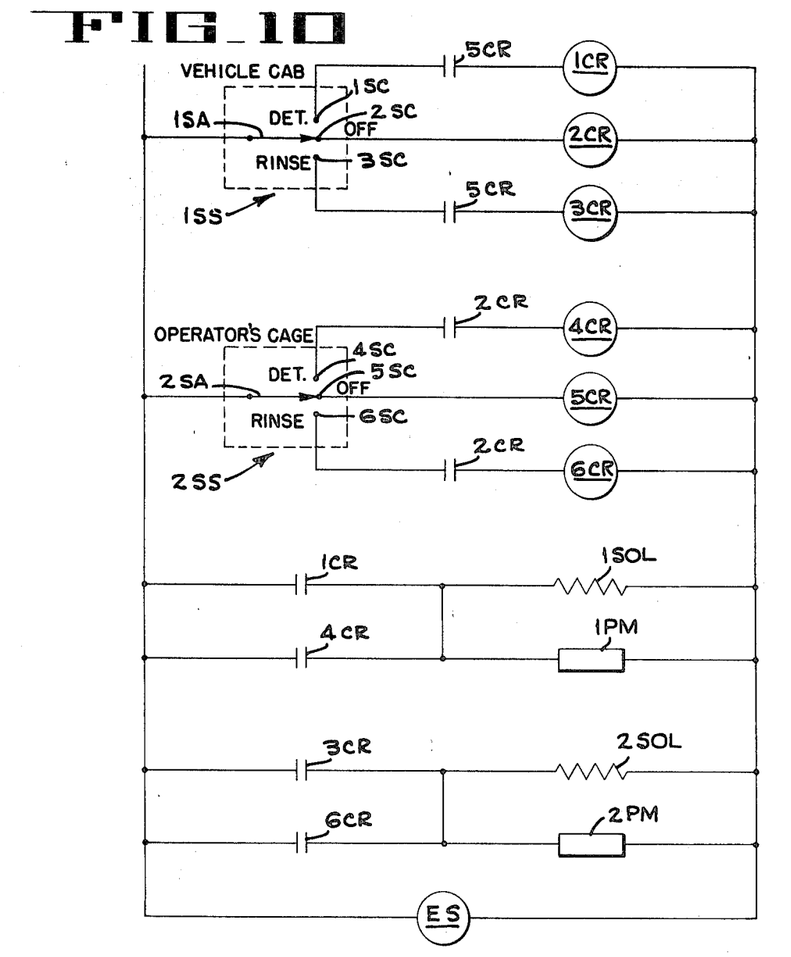
FIG. 10 is a schematic diagram of the electrical circuit for controlling the application of detergent solution and the rinse.

Control of the pumps and valves of FIG. 9 is effected from either the vehicle cab or the operator's cab as shown in FIG. 10. A selector switch 1SS located in the vehicle cab has a movable switch arm 1SA which can selectively be positioned on switch contact 1SC, 2SC or 3SC. Placing switch arm 1SA on contact 1SC will connect relay 1CR across the electrical energy source ES, providing the normally open contacts of relay 5CR are closed, to energize the relay 1CR. Similarly, placing switch arm 1SA on contact 3SC will connect relay 3CR across the source ES, providing the normally open contacts of relay 5CR are closed, to energize relay 3CR. Placing the switch arm 1SA on contact 2SC will connect the relay 2CR across source ES and energize relay 2CR. A second selector switch 2SS located in the operator's cage has a movable switch arm 2SA which can be positioned on contact 4SC, 5SC or 6SC to energize, respectively, relay 4CR (providing the normally open contacts of relay 2CR are closed), relay 5CR, or relay 6CR (providing the normally open contacts of relay 2CR are closed).

If the switch 2SS in the operator's cage is off (on contact 5SC) and relay 5CR energized, either relay 1CR or relay 3CR can be energized by the selector switch 1SS in the vehicle cab. Thus, either normally open contacts 1CR or normally open contacts 3CR can be closed to connect solenoid 1SOL and pump motor 1PM or solenoid 2SOL and pump motor 2PM across source ES to energize the respective solenoids and motors. Energization of solenoid 1SOL opens valve 1V to allow detergent solution from tank 1T to pass under pressure into line 82. Energization of solenoid 2SOL opens valve 2V to allow rinse solution from tanks 2T and 3T to pass under pressure into line 82.

Conversely, if the switch 1SS in the vehicle cab is off (on contact 2SC) and relay 2CR is energized, either relay 4CR or relay 6CR can be energized by the selector switch 2SS in the operator's cage. Thus, either normally open contacts 4CR or normally open contacts 6CR can be closed to connect solenoid 1SOL and pump motor 1PM or solenoid 2SOL and pump motor 2PM across source ES to energize the respective solenoids and motors. Thus, either a detergent solution or a rinse solution for line 82 can be selected from either the vehicle cab or the operator's cage.

Figure 8:
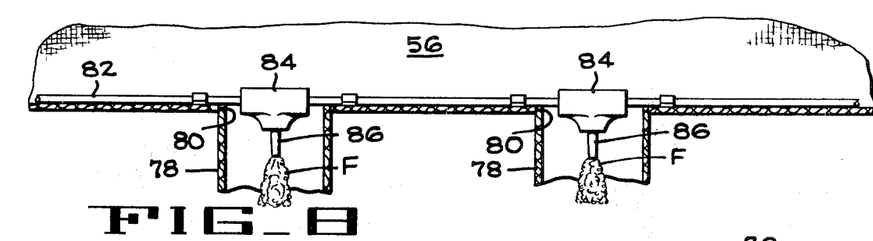
FIG. 8 is an enlarged fragmentary view, partly in cross-section, of the interior of the manifold.

The line 82 which is a flexible conduit, extends through the hollow boom 28 and into the manifold 56. As shown in FIG. 8, at each of the openings 80 over which sleeves 78 are attached, T couplings 84 are inserted in line 82. The base of each T extends into the inner end of a sleeve 78 and has a nozzle 86 secured therein.

After the air is discharging out the ends of sleeves 78, the operator opens the detergent solution valve 1V to permit a solution of detergent F to flow through line 82 and out through nozzles 86, as shown in FIG. 8. This detergent solution oozes out through the porous walls of sleeves 78, at the outer ends thereof, and through the opening, designated at 88, at the outer end of the sleeves, to drench the upper surface of the airplane fuselage with cleaning solution F (as shown, for example in FIG. 4). At the same time, the sleeves, which are closely spaced, as shown in FIG. 2, are agitated by the high velocity air stream discharged therefrom and buffet the surface in a vigorous scrubbing action. It will be noted from FIG. 2 that the entire curved upper surface of the fuselage is simultaneously scrubbed by the spaced sleeves. At the same time, no rigid member is close to the airplane to mar or dent the surface thereof.

With the soft sleeves, which can do no damage to the skin of the plane, flailing and whipping the entire upper contoured surface of the aircraft fuselage, the vehicle 26 is slowly driven alongside the aircraft to clean the entire upper fuselage surface. After this large contoured surface is cleaned, the operator switches to the rinse tanks to discharge a rinse solution through line 82, nozzle 86, and sleeves 78. At this time, the vehicle 26 can be reversed so that the sleeves will cover the same area, but moving in the reverse direction, that was covered during the washing movement. If desired, the operator may shut off the flow through line 82, and again make a pass over the cleaned surface with only the air discharging from the sleeves 78 to dry the surface.

As shown in FIG. 2, the sleeves 78 may be of different lengths, with the center sleeves shorter than the end sleeves, better to accommodate the contoured surface of the aircraft.

As shown in dotted lines in FIG. 2, the operator by releasing latches 66 and turning wheels 64, can reposition the sleeves to selected positions to cleanse the sides of the aircraft fuselage (see the dotted manifold and sleeves of FIG. 2) and, as shown in FIG. 4, other vertical surfaces can also be cleaned with similar positioning of the sleeves 78. With the boom lowered, and the elbows and manifold positioned as shown in FIG. 3, the lower surfaces of the aircraft, such as the wings, can be scrubbed.

Figure 11:
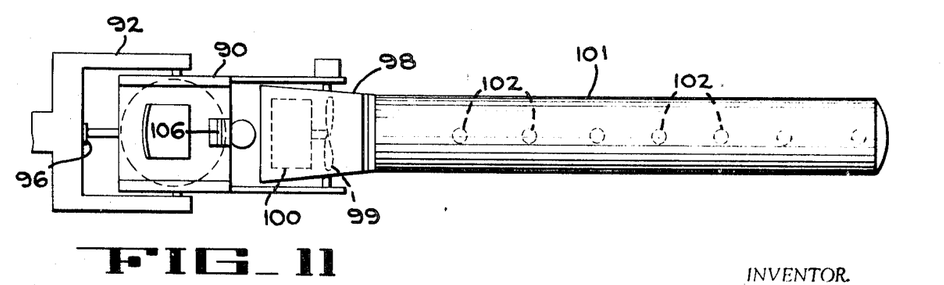
FIG. 11 is a top view of a modification of the apparatus of FIG. 1.
Figure 12:
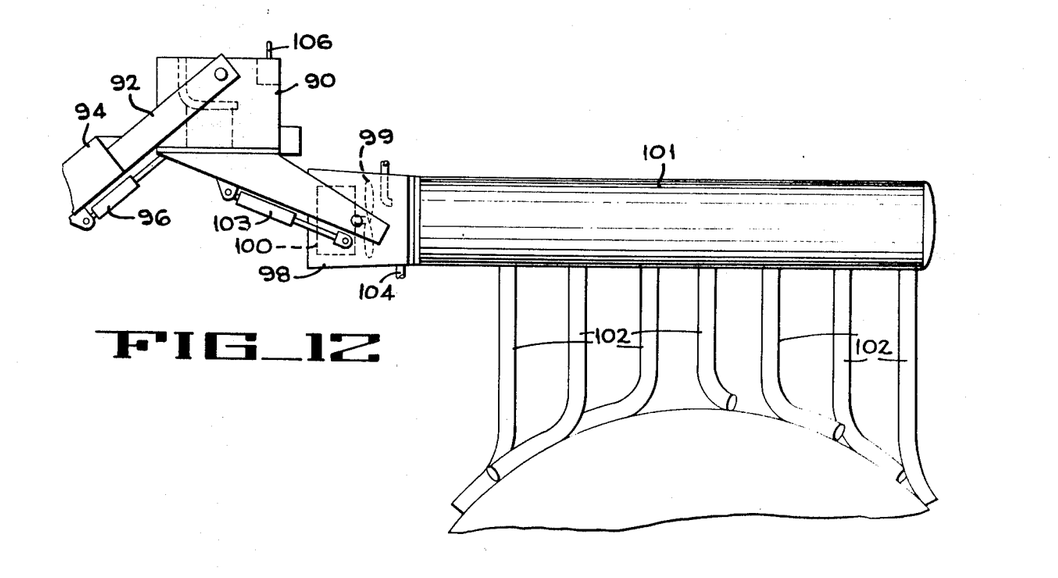
FIG. 12 is a side view of the apparatus of FIG. 11.

In the embodiment shown in FIGS. 11 and 12, an operator's cab 90 is pivotally mounted to a yoke 92 at the upper end of a boom 94 which is mounted on a vehicle (not shown). A ram 96, having one end pivotally connected to boom 94 and having the other end pivotally connected to the cab 90, controls the attitude of the operator's cab. A blower 98, with a propeller 99 and an internal combustion engine 100 to drive the propeller, is mounted on the operator's cab. The blower can be tilted with respect to the operator's cab by means of a ram 103 pivotally connected at one end to the cab and at the opposite end to the blower. A cloth manifold 101 is connected to the output end of the blower 98. The manifold has a vinyl coating and a closed end to be air retentive. A plurality of nylon sleeves 102, open at both ends, are connected over openings in the manifold to receive air therefrom. A line 104 leads from a tank of cleansing solution in the vehicle into the manifold, in the same manner as the line 82 of the previously described embodiment, to discharge cleansing fluid out the sleeves 102 onto the surface to be cleansed. A control panel 106 has controls for tilting the operator's cab, turning on the propeller, and starting the pump to force cleansing fluid through line 104 and controlling the position of the blower and manifold.

Figure 13:
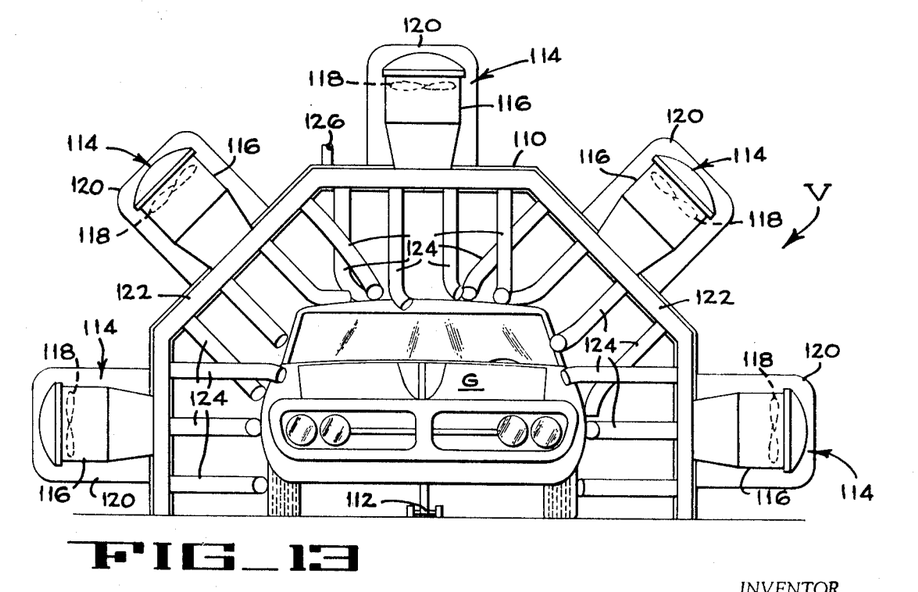
FIG. 13 is a front view in elevation of the apparatus for cleaning automobiles in accordance with the present invention.

FIG. 13 shows apparatus for cleaning automobiles. A frame 110 defines an arch extending around the path of automobiles pulled through the apparatus by the moving chain 112. A plurality of blowers 114 are mounted on frame 110 and spaced thereon around the path of the vehicles. Each blower has a casing 116, a propeller 118 mounted in the casing, and an engine 120 connected to the propeller to drive the propeller. A manifold duct 122 is connected to the frame, and straddles the path of the automobiles. The output end of each casing 116 is connected to an opening in the duct so that the high velocity air stream from each blower assembly is discharged into the duct. A plurality of limp, soft, flexible, cloth sleeves 124, open at both ends, are connected to openings in the manifold duct so that air therefrom is discharged through the sleeves. The force of the air rushing out through the sleeves extends the sleeves and causes the ends thereof to whip against an automobile G passing beneath frame 110.

Preferably, three units V, identical to the unit V (comprising frame 110, blower assemblies 114, manifold duct 122 and sleeves 124) of FIG. 13, are positioned spaced apart in a line along the path of the automobiles G moving through the washing apparatus. The first unit V encountered by a moving automobile has a line 126 leading from a tank (not shown) of detergent to introduce a cleansing, or detergent, solution into duct 122. The detergent passes through duct 122, into sleeves 124 and out through the walls of, and out the outer end opening of, sleeves 124. The ends of the sleeves whip and flutter against the automobile to thoroughly scrub the surface thereof with the detergent.

The next unit V through which the automobile passes has a line 126 through which rinse water is introduced to duct 122. The water is blown out the sleeves onto the automobile to rinse the detergent therefrom. The third unit V under which the automobile passes receives no solution in the duct. Only air is blown through the duct and sleeves 124 onto the automobile to dry the vehicle.

Figure 14:
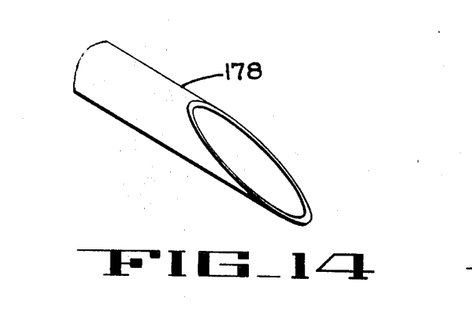
FIGS. 14 and 15 show two different modifications of the ends of the sleeves.
Figure 15:
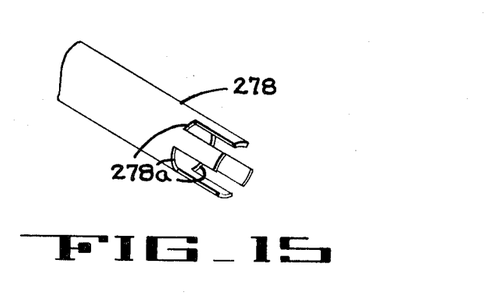

There are shown in FIGS. 14 and 15 two modified forms of sleeves, designated 178 and 278, respectively. Sleeve 178, which is cut on a diagonal, terminates at the outer end on a diagonal plane to increase the end margin of the sleeve. Sleeve 278 has notches 278a extending inwardly from the terminal outer end of the sleeve. Both sleeves, by having extended outer terminal edges, present more cloth to the surface as the end of the sleeves flutters and whips against the surface.

Figures 16, 17:
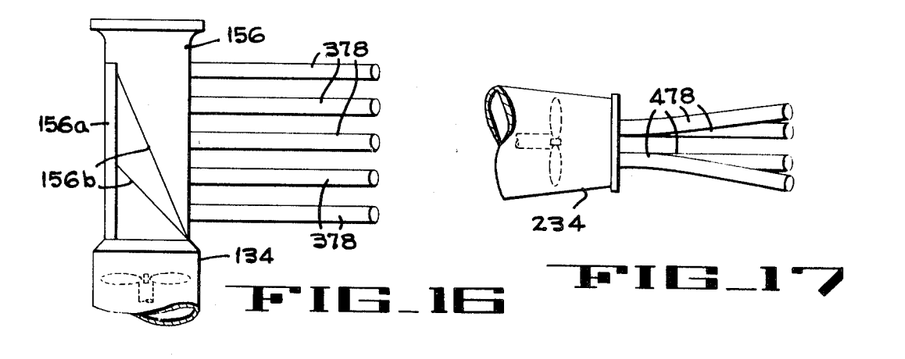
FIG. 16 shows a modification of the manifold.
FIG. 17 shows modified apparatus without a manifold.

FIGS. 16 and 17 show two modified blower units 134 and 234. Blower unit 134 has a closed cloth manifold 156 connected at the output end. A rigid bar 156a which extends outwardly from the blower unit along the edge of the manifold opposite sleeves 378 is attached to the manifold. The bar 156a, which is secured by guy wires 156b, supports the cloth manifold against the reactionary force exerted by the high velocity air discharging from the ends of sleeves 378. In the modification of FIG. 17, the manifold is omitted, and open-ended sleeves 478 are connected directly to the output end of the blower assembly 234 to receive high velocity air therefrom.

Figure 18:
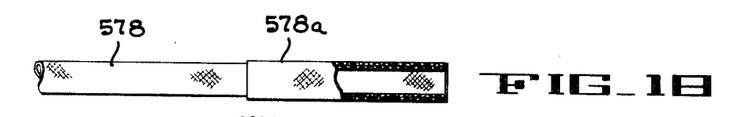
FIGS. 18, 19, 20 and 21 show different modifications of the sleeves.

FIG. 18 shows a modified sleeve 578 having a removable wear sleeve 578a secured on the outer end. The sleeve 578a can readily be replaced when it becomes worn from prolonged scrubbing action against surfaces to be cleaned.

Figure 19:
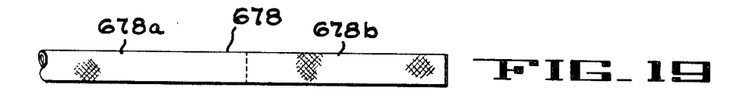

In FIG. 19, another modified sleeve 678 is shown having an inner cloth portion 678a and, secured thereto in end-to-end relation, an outer cloth portion 678b. The inner portion 678a is coated to be fluid retentive while the outer portion 678b is porous to permit a cleansing fluid to ooze through the walls thereof as well as to flow from the outer end thereof. In this manner, the outer end of the sleeve, as it flails the surface to be cleaned, deposits more soap thereon and produces a more effective scrubbing action thereof.

Figure 20:
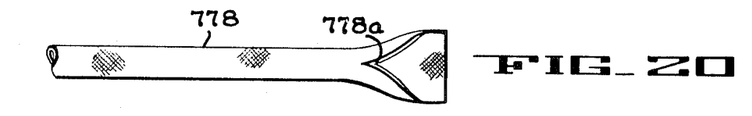

In FIG. 20, a modified sleeve 778 has a slit, at 778a extending inwardly from the outer end to provide a larger cloth area at the outer end for scrubbing engagement with the surface to be cleaned. With the sleeve split at the outer end, the entire outer periphery of the sleeve can simultaneously engage the surface for scrubbing instead of only half the periphery when a tubular sleeve end is used.

Figure 21:
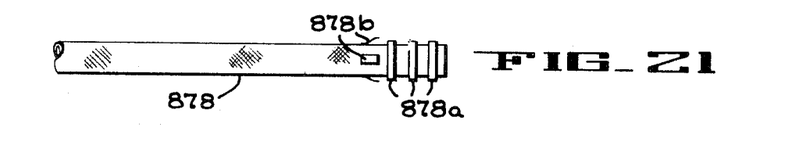

In FIG. 21, scrubbing elements 878a and 878b are shown secured to yet another modified sleeve 878. These elements are made of fiber material and may be in any convenient form, such as bands 878a or strips 878b, as shown.

Although the best mode contemplated for carrying out the present invention has been herein shown and described, the subject matter which is regarded as the invention is set forth in the appended claims.

What is claimed is:

1. The method of cleansing a surface comprising the steps of discharging air through a flexible elongate tubular member to agitate said member and effecting engagement between said agitated member and the surface to be cleansed.

2. The method of washing a surface comprising the steps of discharging air and a cleansing solution through a flexible tube onto said surface and simultaneously applying sufficient pressure to the air to whip the tube into scrubbing engagement with said surface.

3. The method of cleansing a large surface comprising the steps of discharging air through a plurality of flexible sleeves to buffet said sleeves against the surface to be cleansed, and simultaneously effecting relative movement between the sleeves and the surface to be cleansed.

4. The method of claim 3 in which the relative movement between the sleeves and the surface is effected by moving the sleeves along over the surface.

5. The method of claim 3 in which the relative movement between the sleeves and the surface is effected by moving the surface past the sleeves.

6. A device for cleansing a surface comprising a flexible elongated tubular member, means to force air through said member to agitate the member for scrubbing engagement with said surface, and means for forcing a cleaning solution through said member to lather the surface.

7. The device of claim 6 in which the outer end of the elongated member is notched.

8. The device of claim 6 in which the outer end of the elongated member is cut on a line diagonal to the length of the member.

9. The device of claim 6 in which a wear sleeve is placed over the outer end of said elongated member.

10. The device of claim 6 in which said flexible elongated tubular member is a cloth sleeve, having an opening at the outer end.

11. The device of claim 10 in which further means are provided for forcing a cleaning solution into said sleeve to pass through the walls and outer opening of said sleeve for lathering and scrubbing the surface.

12. The device of claim 10 in which said sleeve has a slit extending inwardly from the outer end to increase the area of the sleeve in scrubbing engagement with the surface.

13. The device of claim 10 in which fiber bands are mounted on the outer end of the sleeve for increased scrubbing action on the surface.

14. A device for washing a surface comprising a flexible tube, and means to force air and a cleaning solution through the tube to whip the end of the tube into scrubbing engagement with said surface as the cleaning solution is discharged onto said surface.

15. The apparatus of claim 14 in which the outer end of the tube is more porous than the inner end thereof to pass the cleaning solution therethrough.

16. A device for cleaning a surface comprising a blower to generate a current of air, a duct to receive said current of air, and a plurality of limp flexible tubes in communication with said duct to flutter in whipping contact with said surface as air is discharged from the duct through said tubes.

17. Apparatus for cleansing a large surface comprising a blower to generate a stream of air, a plurality of limp flexible cloth sleeves in communication with said blower to receive the air therefrom, said sleeves open at their outer end for discharge of the air and agitation of the ends of the sleeves as the air is discharged therefrom, and means to effect relative movement between the sleeves and the surface to be cleansed.

18. Apparatus for scrubbing a large surface comprising a carriage to move along beside the surface, a blower mounted on said carriage, said blower operable to discharge a stream of air, a plurality of flexible tubes in fluid communication with said blower to receive the air therefrom, said tubes open at their outer end for discharge of the air therethrough and for whipping action in contact with said surface, and means to propel said carriage along beside the surface to clean said surface.

19. Apparatus for cleaning an airplane comprising a wheeled carriage to move alongside said airplane, a blower mounted on said carriage, a boom pivotally mounted on said carriage, a plurality of limp flexible tubes mounted on said boom and in fluid communication with said blower to receive the air therefrom, said tubes having openings to discharge the air from the blower and for whipping action of the tubes in contact with said surfaces, means to move the boom to position to tubes in selected positions relative to the surface of the airplane, and means to move the carriage along the ground relative to the airplane to clean the surface of the airplane.

20. Apparatus for cleaning an airplane comprising a plurality of flexible tubes, means to support said tubes adjacent a surface of the airplane, means to pass air through said tubes to flutter the tubes adjacent a surface of the airplane, and means to move the tubes along said surface of the airplane.

21. Apparatus for cleaning an airplane comprising a wheeled carriage to move alongside the airplane, a blower to generate a stream of air, said blower mounted on said carriage, a boom pivotally mounted on said carriage, a duct connected to the blower and mounted on the boom, a swivel joint connected to the duct, a manifold duct supported by the swivel joint and in fluid communication with the duct to extend from the end of the boom in a selected direction, a plurality of flexible cloth sleeves mounted on said manifold duct to receive air therefrom, said sleeves having openings at their outer ends to discharge air from the manifold duct, said sleeves extending from the duct and fluttering against the surface of the airplane as air is discharged therethrough, means to move the boom to position the sleeves in selected positions relative to the surface of the airplane, and means to move the carriage along the ground relative to the airplane to clean the surface of the airplane.

22. Apparatus for scrubbing a large surface comprising a frame, means operable to discharge a stream of air, a plurality of flexible tubes mounted on said frame to receive said stream of air, said tubes open at their outer end for discharge of the air therethrough and for whipping action in contact with said surface, and means to move said surface past said frame to clean the surface.

23. Apparatus for cleaning a vehicle comprising means to move the vehicle along a path, a plurality of flexible tubes, means to mount said flexible tubes adjacent said path for engagement with the vehicle, and means to discharge air through said tubes to whip the ends thereof into buffeting engagement with the vehicle.

24. Apparatus for cleaning an automobile comprising means to move the automobile along a path, a plurality of limp flexible tubes mounted to engage when extended the sides and top of an automobile moving along said path, said tubes having openings at their outer ends, and means to pass air through said tubes to extend the tubes and whip their outer ends into a flailing action on the top and sides of the automobile.

25. Apparatus for cleaning an automobile comprising means to move the automobile along a path, an air duct straddling said path, a plurality of cloth sleeves connected to said duct, the outer end of said sleeves having openings therein and positioned when extended for engagement with an automobile moving along said path, and at least one blower in fluid communication with said duct to discharge air through the duct and the sleeves to extend the sleeves and whip the ends thereof into scrubbing contact with the automobile.

26. Apparatus for cleaning an automobile comprising means to move the automobile along a path, a frame having an air duct straddling said path, a plurality of cloth sleeves connected to said duct, the outer end of said sleeves having openings therein and positioned when extended for engagement with an automobile moving along said path, and a plurality of blowers mounted on said frame and in fluid communication with said duct to discharge air through the duct and the sleeves to extend the sleeves and whip the ends thereof into scrubbing contact with the automobile.

27. Apparatus for cleaning a surface comprising a boom, a blower mounted on said boom, and a plurality of flexible tubes mounted in fluid communication with said blower, said tubes having openings through which air from the blower is discharged to agitate said tubes and buffet them against said surface.

28. Apparatus for cleaning an airplane comprising a wheeled vehicle to move alongside said airplane, a boom pivotally mounted on said vehicle, a blower pivotally mounted on the boom, a manifold duct connected to the blower, and a plurality of cloth sleeves connected to the duct, said sleeves having openings at their outer ends for the discharge of air therethrough.

29. Apparatus for cleaning an airplane comprising a wheeled carriage to move alongside the airplane, a blower mounted on said carriage to generate a stream of air, a mechanism to introduce a cleaning substance into the stream of air, a boom pivotally mounted on said carriage, a duct connected to the blower and mounted on the boom, a swivel joint connected to the duct, a manifold duct supported by the swivel joint and in fluid communication with the duct to extend from the end of the boom in a selected direction, a plurality of flexible cloth sleeves mounted on said manifold duct to receive air therefrom, said sleeves having openings at their outer ends to discharge air from the manifold duct, said sleeves extending from the duct and fluttering against the surface of the airplane as air is discharged therethrough, means to move the boom to position the sleeves in selected positions relative to the surface of the airplane, and means to move the carriage along the ground relative to the airplane to clean the surface of the airplane.

References Cited
UNITED STATES PATENTS

| | | | |
|---|---|---|---|
| 1,621,909 | 3/1927 | Smith. | |
| 2,637,873 | 5/1953 | Berezny | 15—53X |
| 2,658,216 | 11/1953 | Shusett. | |
| 2,982,971 | 5/1961 | Garaway | 15—246.5X |
| 3,074,078 | 1/1963 | Varian | 15—1.7X |
| 3,168,896 | 2/1965 | Berg | 134—179X |
| 3,337,896 | 8/1967 | Allen | 15—302 |
| 3,460,177 | 8/1969 | Rhinehart. | |

JOSEPH SCOVRONEK, Primary Examiner

D. G. MILLMAN, Assistant Examiner

US. Cl. X.R.

134—37; 15—302, 381